(12) United States Patent
Dotzler

(10) Patent No.: US 6,215,274 B1
(45) Date of Patent: Apr. 10, 2001

(54) ENHANCED BATTERY PACK MONITORING INTERFACE

(75) Inventor: Kevin Dotzler, Carlsbad, CA (US)

(73) Assignee: Denso Corporation, Aichi-ken (JP)

( * ) Notice: Subject to any disclaimer, the term of this patent is extended or adjusted under 35 U.S.C. 154(b) by 0 days.

(21) Appl. No.: 09/428,697

(22) Filed: Oct. 27, 1999

(51) Int. Cl.[7] .................................................. H01M 10/46
(52) U.S. Cl. ................................................................. 320/106
(58) Field of Search ..................... 320/106, 110, 320/150, 112

(56) References Cited

U.S. PATENT DOCUMENTS 5,525,890 * 6/1996 Iwatsu et al. .
5,696,433 * 12/1997 Patino .
5,945,803 * 8/1999 Brotto et al. .

* cited by examiner

Primary Examiner—Edward H. Tso
(74) Attorney, Agent, or Firm—Fish & Richardson P.C.

(57) ABSTRACT

An enhanced battery pack monitoring interface combines battery pack model identification and temperature monitoring functions. The enhanced system eliminates the need for some connecting contacts as well as several logic and converter circuits in the portable electronic device and the battery pack.

14 Claims, 8 Drawing Sheets

ENHANCED BATTERY PACK MONITORING INTERFACE

BACKGROUND

The present specification relates to a battery pack for a portable electronic device.

A battery pack is typically the main power source for portable electronic devices, such as cellular phones and portable computers. However, a battery pack can require careful handling, particularly during recharging. For example, in order to avoid damage, some kinds of batteries should typically be charged only when within a certain temperature range. Accordingly, many portable electronic devices provide mechanisms for monitoring the temperature of the battery pack to avoid charging the pack outside of its preferred temperature range.

The battery pack's temperature can be monitored using a temperature sensing device to ascertain the precise temperature of the battery pack before charging. For example, a thermistor placed near or in contact with the battery pack is used to relay temperature information to a processor in the portable device powered by the battery pack.

A cellular phone handset uses a rechargeable battery pack that often uses electrical connections. The handset often draws power, supplies charging current, verifies the model of the battery pack, and monitors the cell voltage and temperature during charge and discharge. This uses several logic circuits and analog-to-digital converters (ADC) in the handset, as well as many connecting contacts to the battery pack. A battery identification resistor provides a convenient method of tagging and identifying the battery pack.

SUMMARY

The present disclosure involves an enhanced battery pack monitoring interface which combines battery pack model identification and temperature monitoring functions. The enhanced system can eliminate the need for some connecting contacts as well as several logic and converter circuits in the portable electronic device and the battery pack.

A combined battery model identification and temperature sensing element in the battery pack produces a resistive signal which is received by electronics in the portable device. The device electronics operates to extract both battery type and temperature information from the received signal. A gross resistance value in the signal indicates the battery type while the temperature is determined by an algorithmically compensated fine resistance value.

The details of one or more embodiments are set forth in the accompanying drawings and the description below. Other embodiments and advantages will become apparent from the following description and drawings, and from the claims.

BRIEF DESCRIPTION OF THE DRAWINGS

These and other aspects will be described in reference to the accompanying drawings wherein.

Like reference numbers and designations in the various drawings indicate like elements.

DETAILED DESCRIPTION

Figure 1A:
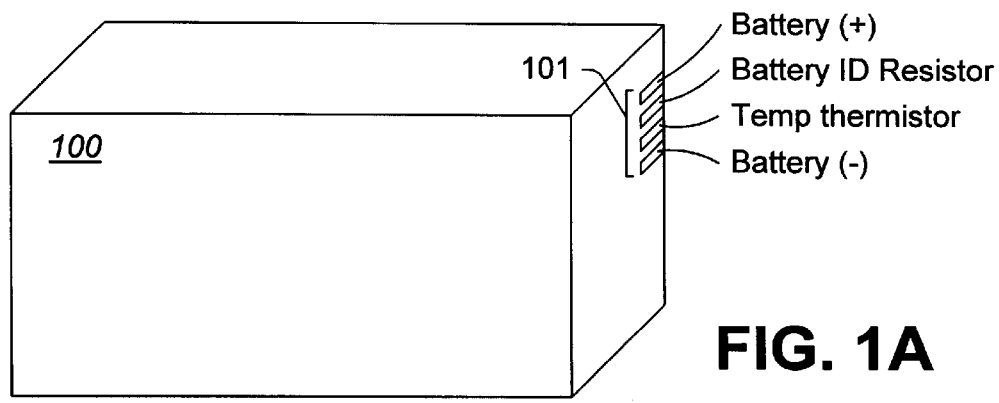
FIG. 1A shows a conventional battery pack typically used in a portable electronic device.

FIG. 1A shows a front perspective view of a conventional battery pack 100 typically used in a portable electronic device. The conventional battery pack 100 has four connections 101: the positive and the negative terminals supplying the battery power, a battery model ID resistor terminal, and a temperature sensing device terminal.

Figure 1B:
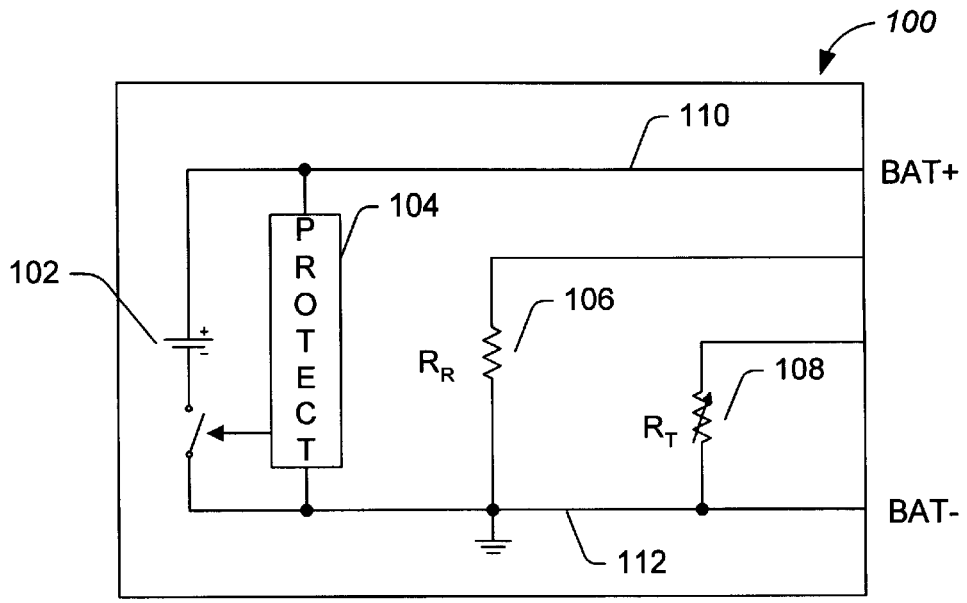
FIG. 1B is a block diagram of the conventional battery pack.

A block diagram of a battery pack 100 is shown in FIG. 1B. Battery 102 has a positive terminal connected to BAT+ output 110 and its negative terminal connected to BAT– output 112. The battery pack 100 also includes a battery protection circuit 104 coupled to the positive and the negative terminals of the battery 102.

A battery model ID resistor 106 identifies a type of battery 102 used in the battery pack 100. This information is typically used by a portable device processor to adjust device parameters according to the battery model or type. A temperature sensing device 108, such as a thermistor, enables the device processor to monitor the temperature of the battery pack 100.

Figure 1C:
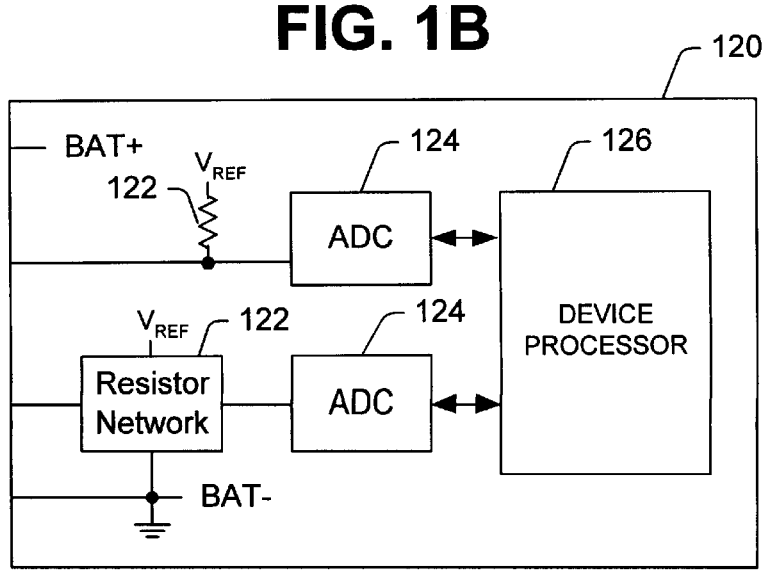
FIG. 1C shows a portable device electronics which connects to the conventional battery pack.

FIG. 1C shows a portable device electronics 120 which is powered by battery pack 100. The device electronics 120 has four connections to match the battery pack 100 connections, and is powered through BAT+ and BAT– terminals. The device electronics 120 also includes resistor networks 122, ADCs 124 and a device processor 126.

The resistor networks 122, connected to the battery model ID terminal and the temperature sensing terminal, translate the resistance values of the battery model ID resistor 106 and the thermistor 108 to analog voltages. The ADC circuit 124 converts the analog voltages to digital values indicative thereof. The device processor 126 uses the digital information to determine the type and temperature of the battery pack.

Figure 2A:
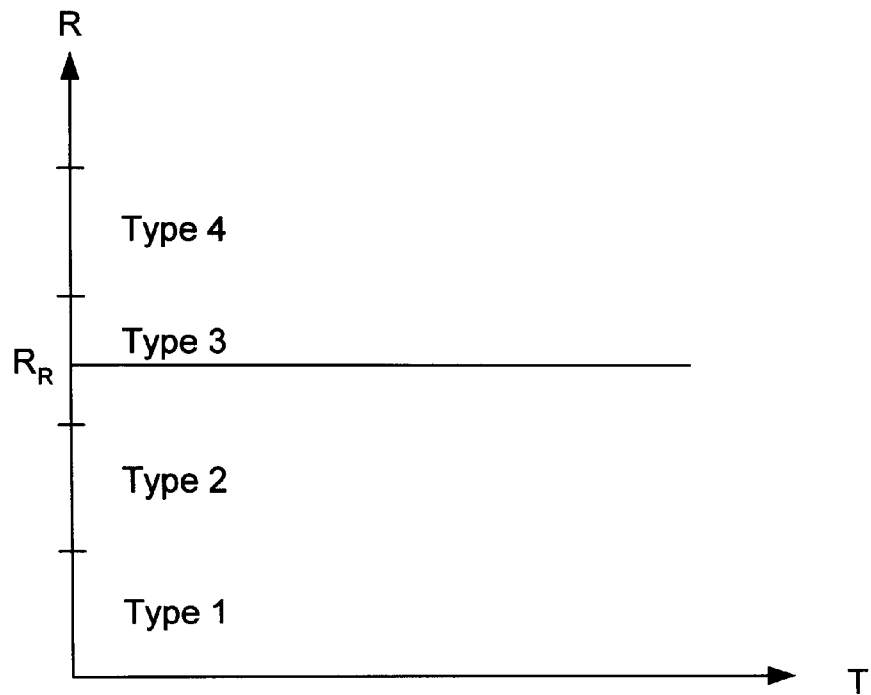
FIGS. 2A and 2B are the response profiles of a battery model ID resistor and a thermistor, respectively.
Figure 2B:
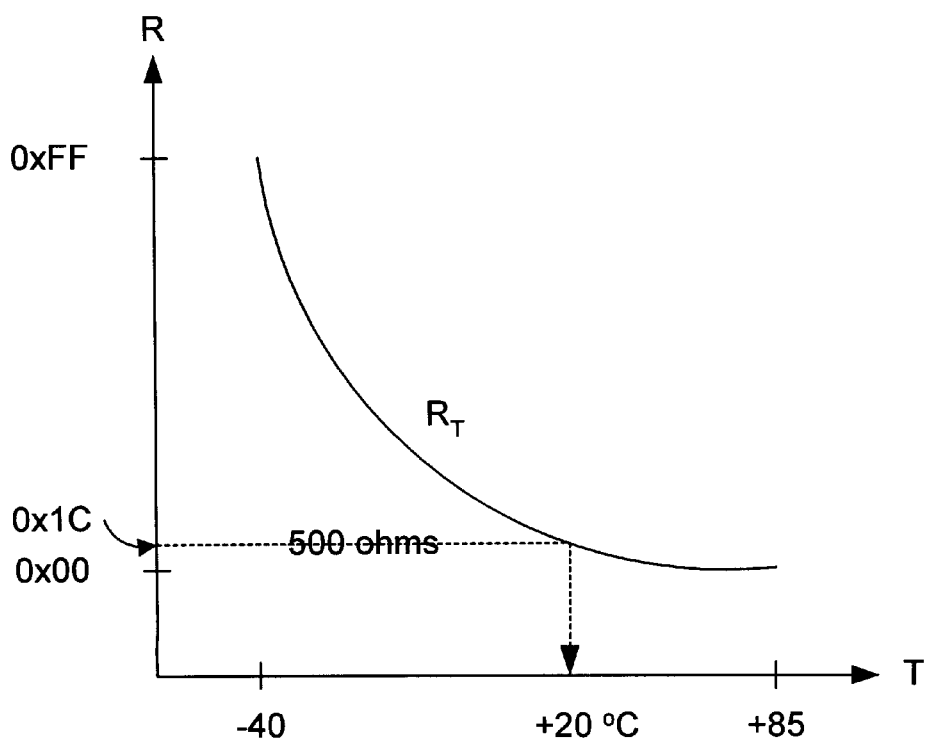

FIGS. 2A and 2B illustrate the response profiles of the battery model ID resistor 106 and the thermistor 108, respectively. The battery model ID resistor 106 response profile shows a constant resistance value, $R_R$, to indicate a specific type of battery pack. The thermistor 108 response profile shows a non-linear response for translating the digital information to a temperature reading. Thus, for example, a resistance value of 500 ohms, which may be equivalent to a digital value 0x1C, translates to 20° C.

Figure 3A:
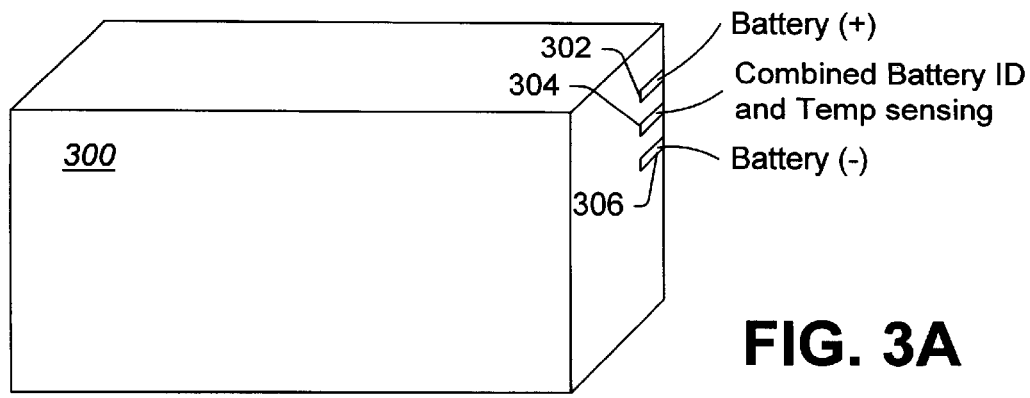
FIG. 3A is a diagram of an enhanced battery pack.

FIG. 3A shows a front perspective view of an enhanced battery pack 300 for a portable electronic device. The enhanced battery pack 300 has only three connections 302, 304, 306. Two of the three connections are for the positive 302 and the negative 306 terminals supplying the battery power. The remaining connection 304 supplies a combined battery identification and temperature information. The connections 302, 304, 306 are made of conducting material to supply power and information to a portable electronic device.

Figure 3B:
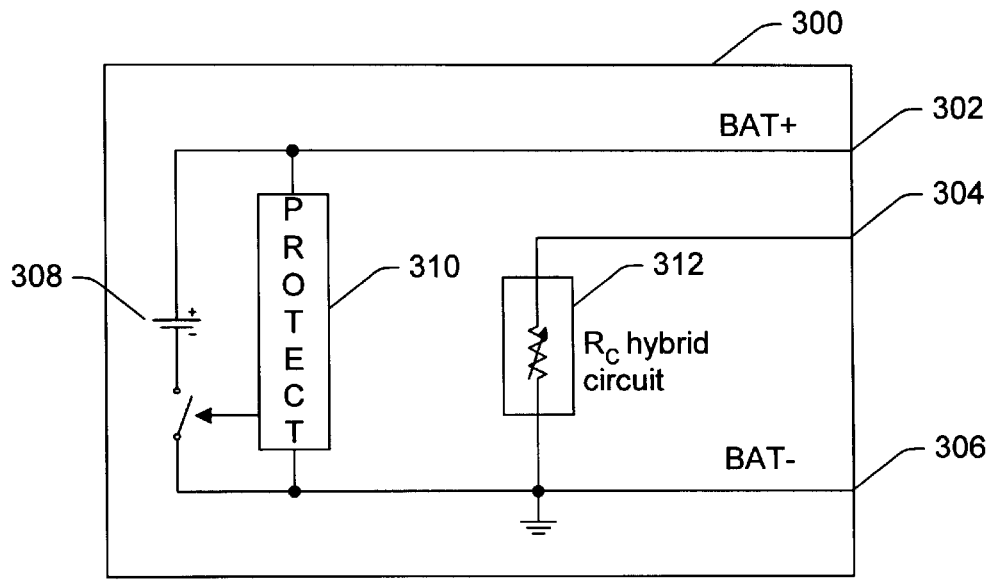
FIG. 3B is a block diagram of the enhanced battery pack.

FIG. 3B shows a block diagram of the enhanced battery pack 300. The figure shows a battery 308 with its positive terminal connected to BAT+ output 302 and its negative terminal connected to BAT− output 306. The battery pack 300 also includes a battery protection circuit 310 coupled to the positive and the negative terminals of the battery 308.

The enhanced battery pack 300 combines the battery pack model ID and temperature monitoring functions by adding a model ID resistor to a thermistor circuit to form a hybrid circuit 312. In some embodiments, the hybrid circuit 312 is configured to operate in a narrower band of resistance values than the thermistor 108 in the conventional battery pack 100. However, the operating temperature range is same as the conventional battery pack 100. The band of resistance values, in which the hybrid circuit 312 operates, indicates the model or the type of the battery pack 300, whereas the response profile of the hybrid circuit 312 specifies a particular temperature corresponding to a resistance value within the band.

Figure 3C:
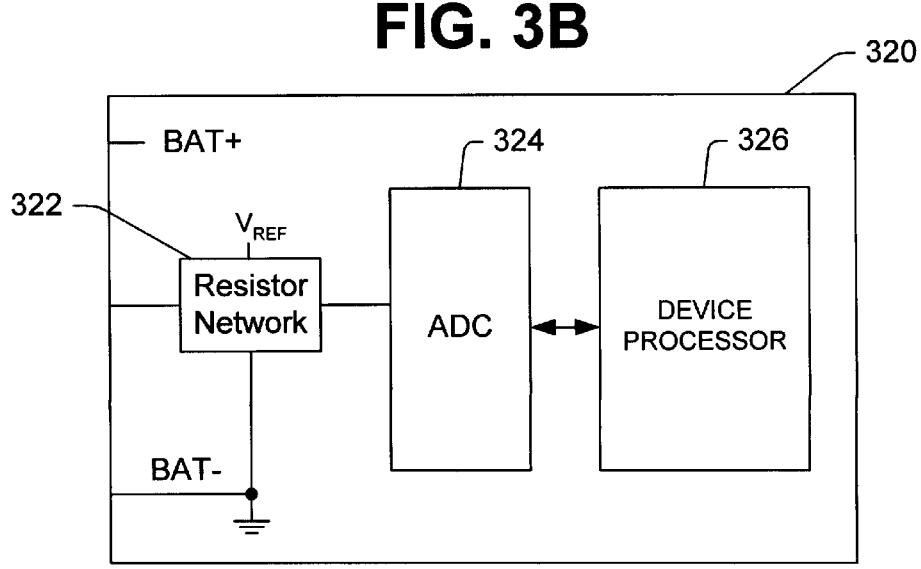
FIG. 3C shows a portable device electronics for an enhanced battery pack.

FIG. 3C shows portable device electronics 320 which connects to an enhanced battery pack 300. The device electronics 320 has only three connections to match the enhanced battery pack 300 connections, and is powered through BAT+ and BAT− terminals. The connections are similarly made of conducting material to receive power and information from the battery pack 300. The device electronics 320 includes only one resistor network 322 and one ADC 324 to translate and convert the measured resistance value into a digital data. A device processor 326 processes the digital data into battery model ID and temperature reading.

Figure 4:
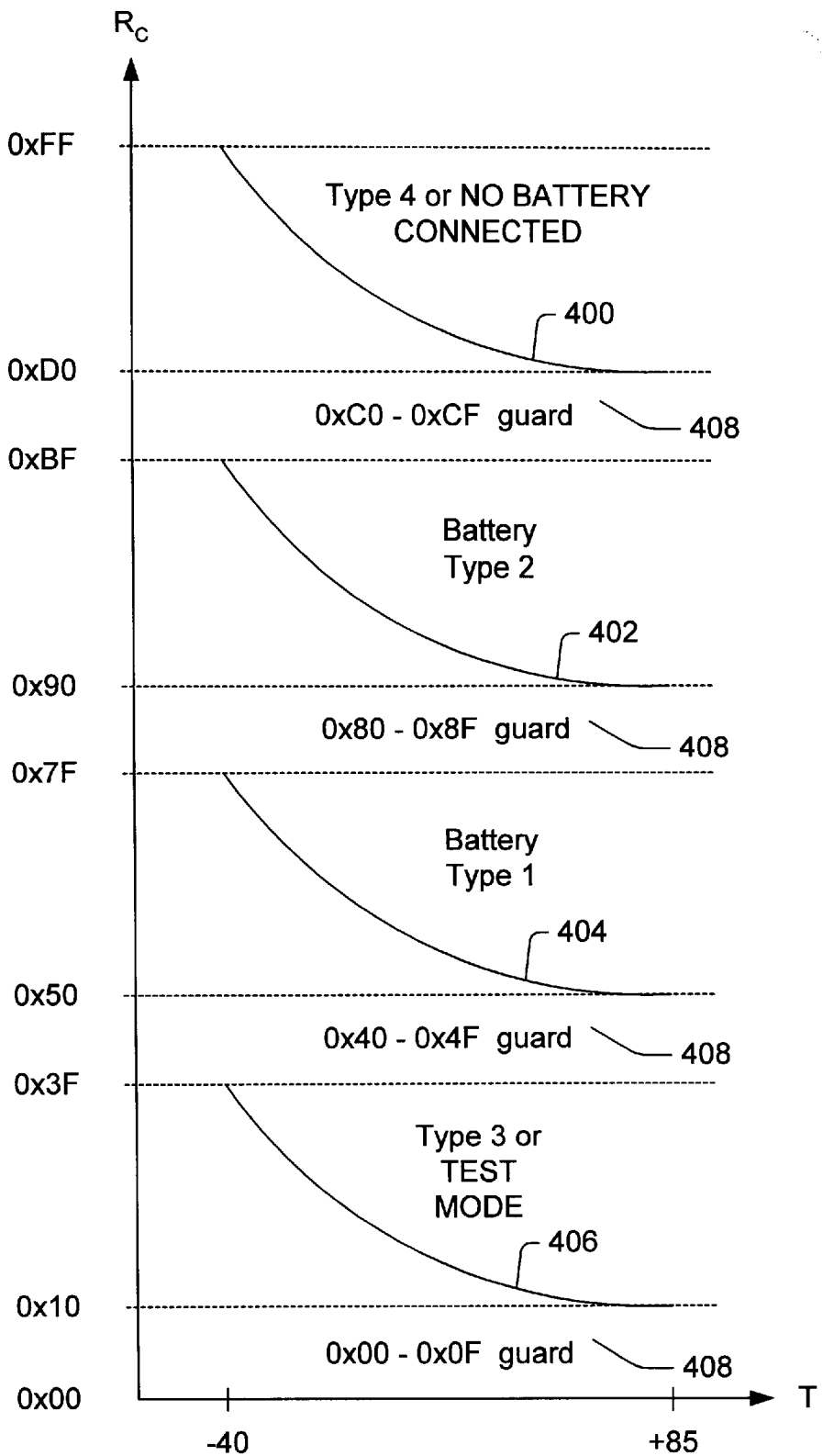
FIG. 4 is a response profile of a thermistor/resistor hybrid circuit.

FIG. 4 shows a response profile of the hybrid circuit 312 in the battery pack 300 in which bands of resistance values correspond to different types of battery packs. Since the total dynamic range of resistance values is same as the conventional battery pack, the band for any particular battery type is narrower than the conventional battery pack. However, in some embodiments, the resolution and the accuracy of the temperature reading is made comparable or higher by using higher resolution or higher order ADCs (i.e. more bits).

In one embodiment, the total dynamic range of resistance values is chosen to be from 0x00 to 0xFF (hex) with the total range divided into four bands 400, 402, 404, 406. In some embodiments, each of the four bands represents a battery type, thus allowing for four types of battery packs. In other embodiments, some bands represent a 'no battery connected' mode 400 and a 'test' mode 406. Each band is also provided with a guard band 408 to prevent ambiguity in recognizing the battery model or type.

Once the battery type or model has been identified, the ADC input range is configured to narrow in on the voltage range, and subsequently the temperature range, for the battery of interest.

Figure 5:
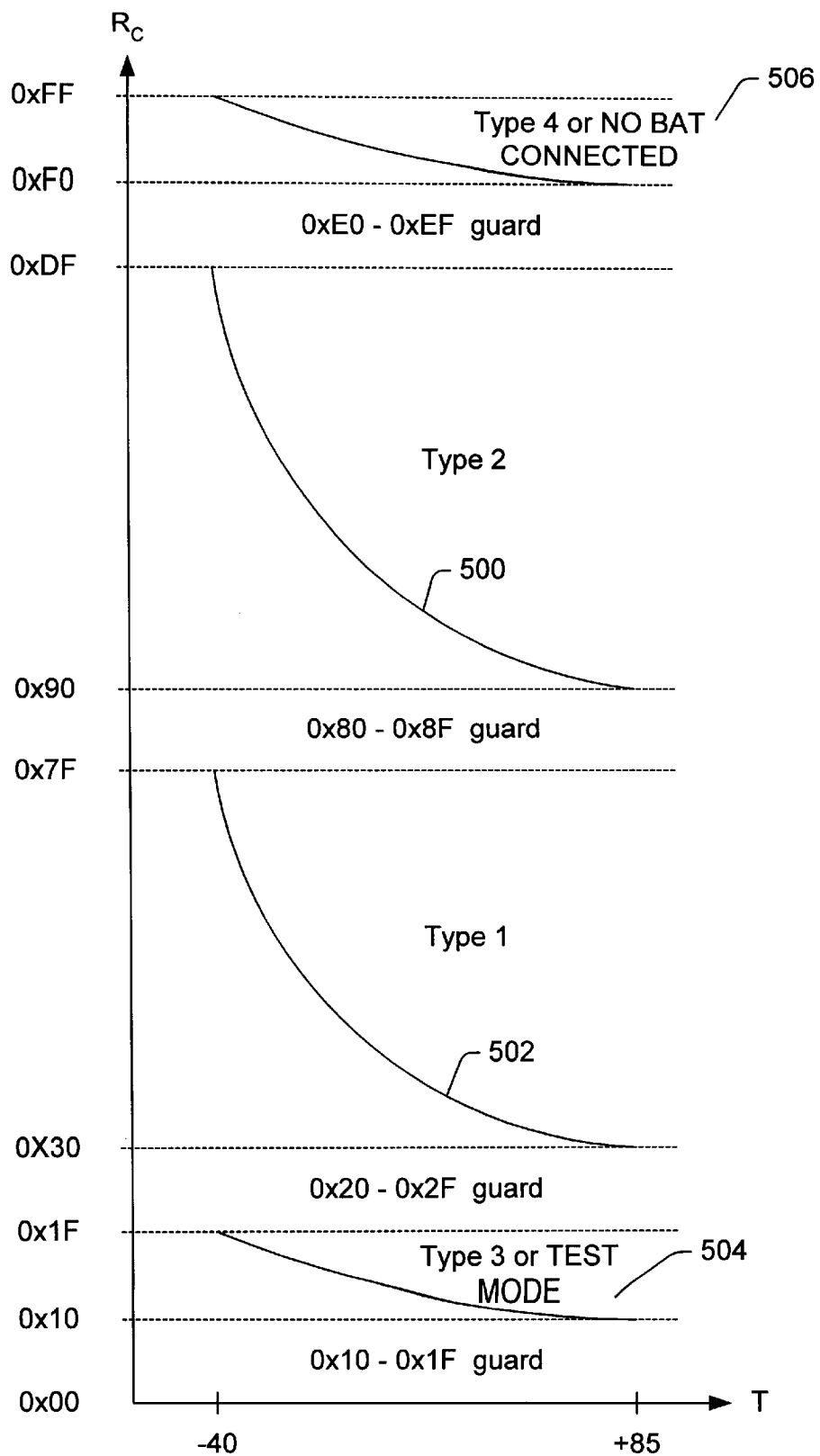
FIG. 5 is a response profile of an alternative embodiment of the hybrid circuit in which some bands are extended from the center toward the extremes in order to increase the resolution.

FIG. 5 shows a response profile of an alternative embodiment. of the hybrid circuit 312 in which some bands are extended from the center toward the extremes in order to increase the resolution. The more often-used battery types are assigned to wider bands. For example, the battery types one 500 and two 502 are assigned to the bands that are five times as wide as the battery types three 504 and four 506. In some embodiments, the battery types three 504 and four 506 are used to represent a 'no battery' mode and a 'test' mode.

Figure 6:
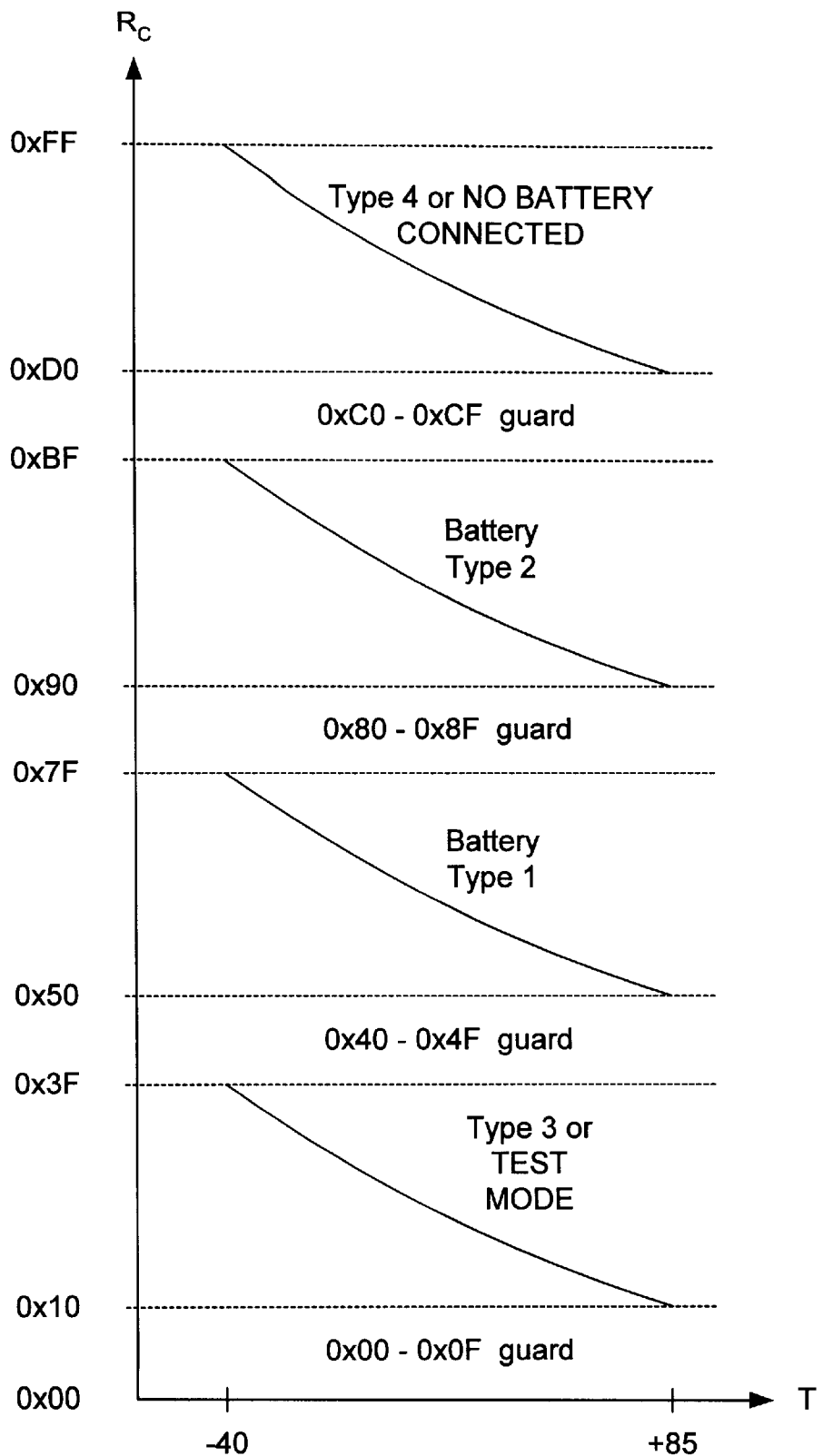
FIG. 6 shows a further embodiment in which the response profile of the hybrid circuit is linear.

A further alternative embodiment is shown in FIG. 6 in which the response profile of the hybrid circuit 312 is linear. The linear response circuit 312 provides a more accurate and uniform temperature resolution. In other embodiments, the thermistor/resistor configuration in the hybrid circuit 312 is optimized for each battery type, given the required dynamic range for each.

Figures 7A, 7B:
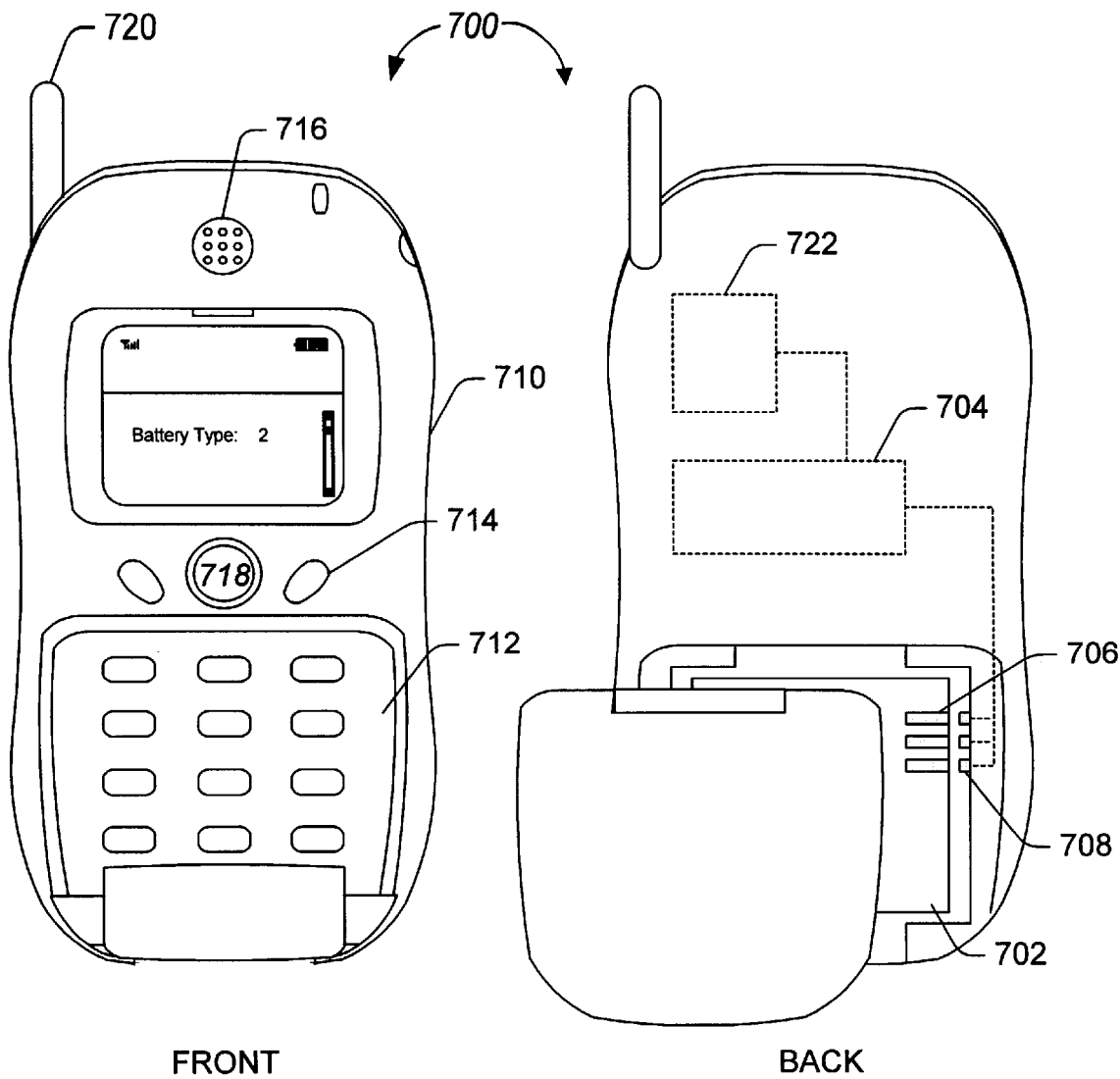
FIGS. 7A and 7B show a cellular telephone system using an enhanced battery pack and a corresponding electronic circuitry.

FIGS. 7A and 7B show front and rear views of a cellular telephone handset 700 using an enhanced battery pack 702 and a corresponding device electronics 704. The conducting connections 706 on the battery pack 702 mate with the corresponding connections 708 on the handset 700 which connect to the device electronics 704. The handset 700 also includes a key pad 712, various other buttons 714, a speaker 716, a microphone 718, an antenna 720, and other communication electronics 722 contained within the telephone housing 710.

Figure 8A:
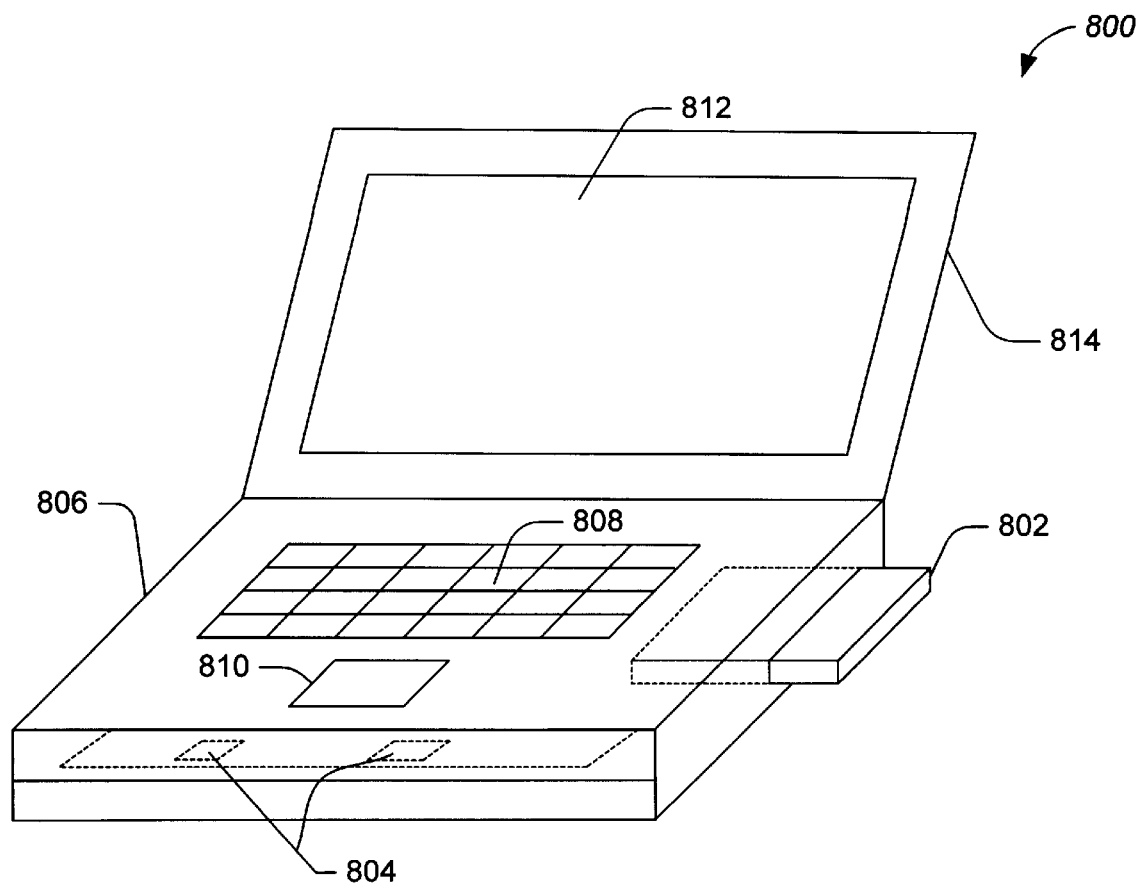
FIGS. 8A and 8B show a portable computer using an enhanced battery pack and a corresponding electronic circuitry.
Figure 8B:
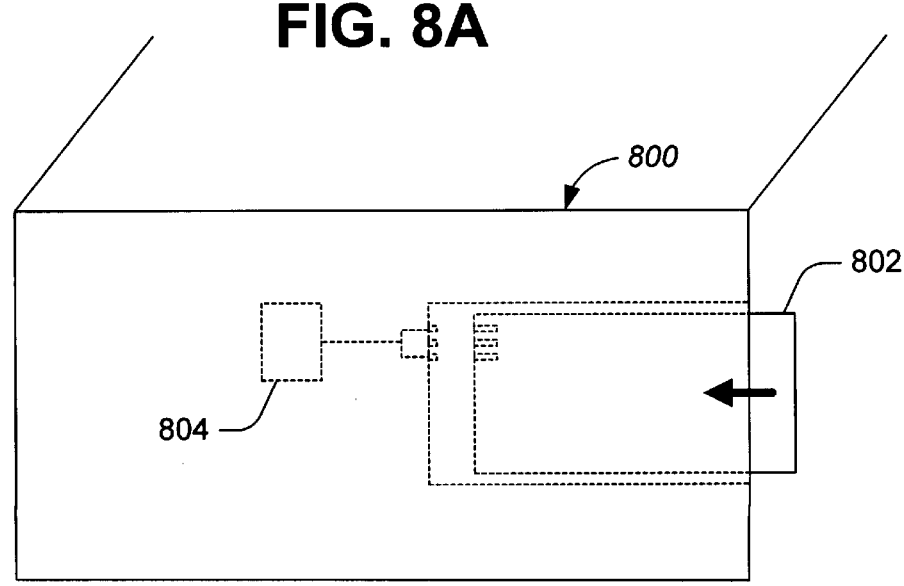

FIGS. 8A and 8B show top and bottom perspective views of a portable computer 800, such as a laptop computer, using an enhanced battery pack 802 and a corresponding electronic circuitry 804. The portable computer 800 also includes a main housing 806 that protects the computer's electronic circuitry 804; input devices, such as a keyboard 808 and a touchpad 810; and one or more output devices, such as a flat-panel display 812 embedded in a lid housing 814.

The advantageous features of the enhanced battery pack monitoring interface system include fewer connecting contacts between the battery pack and the portable electronic device, as well as decrease in component counts of logic and converter circuitry in the battery pack and the portable electronic device. These features lower the cost of manufacturing both devices. They also can lower the cost of a battery recharger since there are fewer connecting contacts. The contact area can also be made smaller.

Although only a few embodiments have been described in detail above, those of ordinary skill in the art certainly understand that modifications are possible. For example, the combined interface technique is flexible enough to include other monitoring functions which can be sensed with thermistor/resistor combination. In addition, the number of connections (e.g. three in this disclosure) between the enhanced battery pack and a portable device can be changed to fit the needs of a particular application. All such modifications are intended to be encompassed within the following claims, in which:

What is claimed is:

1. A battery monitoring interface system for a portable device, comprising:
   a battery casing;
   battery power terminals;
   a single terminal, providing a combined battery model identification and temperature sensing element output signal, where said output signal includes a resistance value measured by a combined battery model identification and temperature sensing element; and
   electronic components within the portable device, configured to receive said output signal, said electronic components operating to extract information relating to both model identification and temperature of a battery pack from the output signal.

2. The system of claim 1, wherein said electronic components include a resistor network operating to convert said resistance value into an analog voltage.

3. The system of claim 2, wherein said electronic components further include a converter and a processor operating to convert said analog voltage into a digital data representing a battery temperature.

4. The system of claim 1, wherein said interface system provides battery model identification by dividing the total range of resistance values of said combined battery model identification and temperature sensing element into a plurality of sub-ranges.

5. The system of claim 4, wherein the total range is divided equally to provide equal size sub-ranges.

6. The system of claim 4, wherein the total range is divided so as to provide wider sub-ranges for more often used battery types.

7. The system of claim 4, further comprising a guard band between two adjacent sub-ranges.

8. The system of claim 4, wherein said interface system provides temperature information of the battery pack by profiling a response characteristic of said combined battery model identification and temperature sensing element within a sub-range of said plurality of sub-ranges identified by a battery type.

9. The system of claim 8, wherein said combined battery model identification and temperature sensing element is configured to provide an approximately linear response profile.

10. A combined battery model identification and temperature sensing system for a portable device, the system comprising:

a battery pack having an element capable of providing both battery model identification and temperature sensing function; and a circuitry adapted to receive battery model and temperature information from said element, said circuitry operating to provide the portable device with said information in a form capable of being processed by electronics in the portable device.

11. The system of claim 10, wherein said circuitry includes a converter and a processor.

12. A portable electronic device comprising:

a housing;

a battery pack within the housing, said battery pack having an element capable of providing both battery model identification and temperature sensing function; and electronic circuits within the housing, said circuits adapted to receive battery model and temperature information from, said element, said circuits operating to provide the portable electronic device with said information in a form capable of being processed by the portable electronic device.

13. The device of claim 12, wherein said device is a cellular telephone handset.

14. The device of claim 12, wherein said device is a laptop computer.

* * * * *